United States Patent
Bai et al.

(10) Patent No.: US 12,251,821 B2
(45) Date of Patent: Mar. 18, 2025

(54) VEGETABLE TRANSPLANTING DEVICE WITH ARTIFICIAL INTELLIGENCE ROBOTIC ARM

(71) Applicant: Wuhan Carden Education Technology Co., Ltd., Wuhan (CN)

(72) Inventors: Zuxin Bai, Wuhan (CN); Jing Du, Wuhan (CN)

(73) Assignee: Wuhan Carden Education Technology Co., Ltd., Wuhan (CN)

( * ) Notice: Subject to any disclaimer, the term of this patent is extended or adjusted under 35 U.S.C. 154(b) by 351 days.

(21) Appl. No.: 18/145,371

(22) Filed: Dec. 22, 2022

(65) Prior Publication Data
US 2023/0202054 A1 Jun. 29, 2023

(30) Foreign Application Priority Data
Dec. 25, 2021 (CN) .......................... 202123288930.6

(51) Int. Cl.
| G06F 17/00 | (2019.01) |
| B25J 9/00 | (2006.01) |
| B25J 15/00 | (2006.01) |
| B25J 15/02 | (2006.01) |

(52) U.S. Cl.
CPC ........... B25J 15/026 (2013.01); B25J 9/0009 (2013.01); B25J 15/0033 (2013.01)

(58) Field of Classification Search
CPC .... B25J 15/026; B25J 9/0009; B25J 15/0033; B25J 15/0042
USPC ........................................................ 700/245
See application file for complete search history.

(56) References Cited

U.S. PATENT DOCUMENTS 11,256,303 B2 * 2/2022 Xia ....................... G06F 1/1616

FOREIGN PATENT DOCUMENTS

| CN | 212711034 U | * | 3/2021 | ............... B65G 1/04 |
| EP | 0267290 B1 | * | 12/1993 | |
| JP | 2009055923 A | * | 3/2009 | |
| KR | 20060012040 A | * | 2/2006 | |

OTHER PUBLICATIONS

Review of smart robots for fruit and vegetable picking in agriculture (Year: 2022).*

* cited by examiner

*Primary Examiner* — Ronnie M Mancho
(74) *Attorney, Agent, or Firm* — ANOVA LAW GROUP, PLLC

(57) ABSTRACT

A vegetable transplanting device includes a robotic arm, a positioning ring fixedly disposed on an outside of the robotic arm, and a transplant assembly connected to the robotic arm. The transplant assembly includes: a motor fixedly disposed at an end of the robotic arm; a fixing frame fixedly mounted on a side surface of the positioning ring away from the robotic arm; a worm screw fixedly disposed at an output end of the motor; first fixing rods fixedly disposed and passing through the fixing frame; worm gears, each rotatably installed on an outside of one of the first fixing rods, the worm gears being engaged with the worm screw by teeth; connecting rod assemblies, each rotatably installed on the outside of at least one of the first fixing rods; and clamping members, each rotatably connected to one end of the corresponding connecting rod assembly away from the fixing frame.

16 Claims, 3 Drawing Sheets

VEGETABLE TRANSPLANTING DEVICE WITH ARTIFICIAL INTELLIGENCE ROBOTIC ARM

CROSS-REFERENCE TO RELATED APPLICATION

This application claims priority to Chinese Patent Application No. 202123288930.6, filed on Dec. 25, 2021, the content of all of which is incorporated herein by reference.

TECHNICAL FIELD

The present disclosure relates to vegetable transplanting field and, more particularly, to a vegetable transplanting device with an artificial intelligent robotic arm.

BACKGROUND

Vegetables refer to a class of plants or fungi that can be cooked and made into an edible dish. Vegetables are one of the essential foods in people's daily diet. Vegetables can provide a variety of vitamins and minerals necessary for the human body. Transplantation is the process of transferring a growing vegetable.

In related art, the vegetables can be transplanted by a robotic arm. However, in practical operation, the vegetables are easily damaged due to a clamping part of the robotic arm, which reduces the survival rate of the transplanted vegetable. It is also difficult to precisely control the holding force of the robotic arm.

SUMMARY

One aspect of the present disclosure provides a vegetable transplanting device. The device includes a robotic arm, a positioning ring fixedly disposed on an outside of the robotic arm, and a transplant assembly connected to the robotic arm. The transplant assembly includes: a motor fixedly disposed at an end of the robotic arm; a fixing frame fixedly mounted on a side surface of the positioning ring away from the robotic arm; a worm screw fixedly disposed at an output end of the motor; first fixing rods fixedly disposed and passing through the fixing frame; one or more worm gears, each rotatably installed on an outside of one of the first fixing rods, each worm gear being engaged with the worm screw by teeth; connecting rod assemblies, each rotatably installed on the outside of at least one of the first fixing rods; and clamping members, each rotatably connected to one end of the corresponding connecting rod assembly away from the fixing frame.

Another aspect of the present disclosure provides a transplant assembly used in a vegetable transplanting device. The transplant assembly includes: a motor fixedly disposed at an end of a movable arm of the vegetable transplanting device; a fixing frame fixedly mounted on a side surface of a positioning ring of the vegetable transplanting device away from the movable arm; a worm screw fixedly disposed at an output end of the motor; first fixing rods fixedly disposed and passing through the fixing frame; one or more worm gears, each rotatably installed on an outside of one of the first fixing rods, each worm gear being engaged with the worm screw by teeth; connecting rod assemblies, each rotatably installed on the outside of at least one of the first fixing rods; and clamping members, each rotatably connected to one end of the corresponding connecting rod assembly away from the fixing frame.

BRIEF DESCRIPTION OF THE DRAWINGS

Embodiments are shown and explained with reference to the accompanying drawings. The drawings are used to clarify basic principles and thus show only aspects necessary to understand the basic principles. The drawings are not according to scale. In the drawings, same reference numbers represent similar features.

Figure 1:
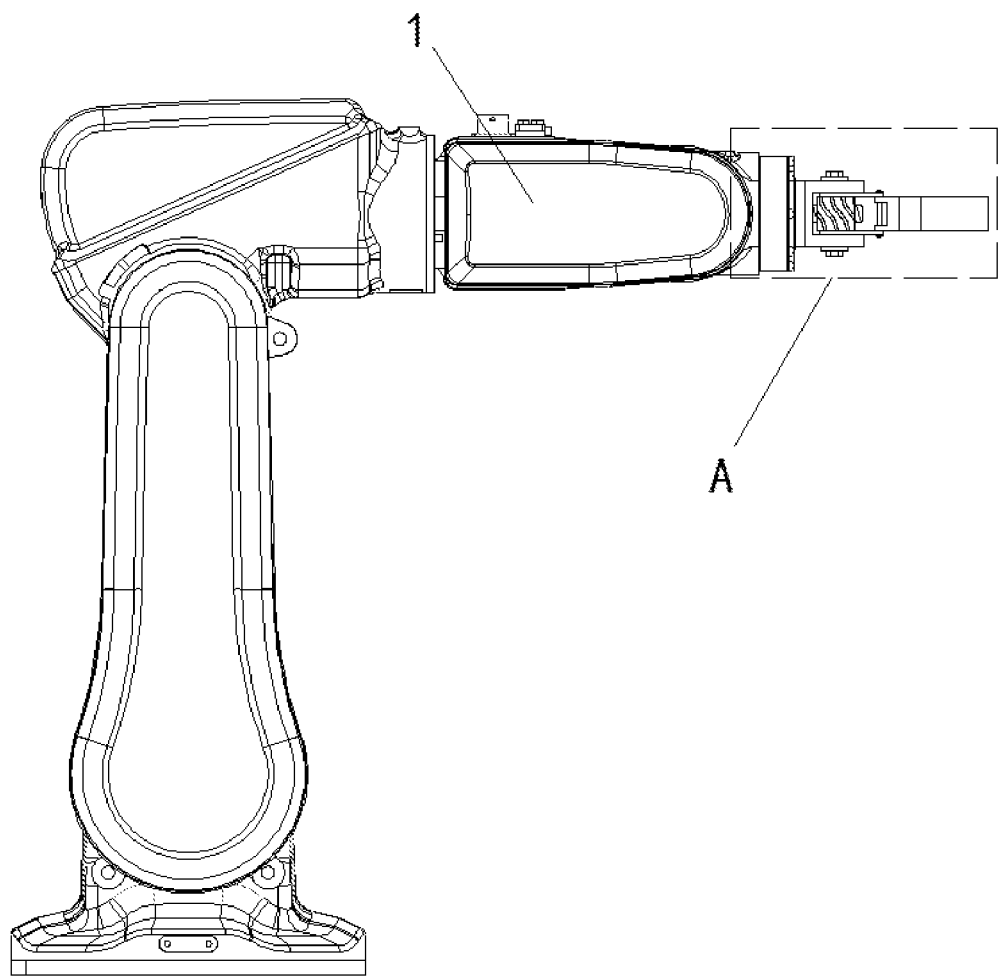
FIG. 1 is a schematic diagram of a front view of a vegetable transplanting device according to an embodiment of the disclosure.

Reference numerals: Robotic arm 1; positioning ring 2; motor 3; worm screw 4; fixing frame 5; first fixing rod 6-1; second fixing rod 6-2, worm gear 7; first connecting rod 8; bolt 9; second connecting rod 10; clamping member 11; notch 12; and clamping groove 13.

Other features, characteristics, advantages, and benefits of the present disclosure may become more apparent from the following detailed description in connection with the accompanying drawings.

DETAILED DESCRIPTION OF THE EMBODIMENTS

For the following detailed description of preferred embodiments, reference will be made to the accompanying drawings which form a part of the present disclosure. The accompanying drawings show specific embodiments in which the present disclosure can be realized through examples. Exemplary embodiments are not intended to be exhaustive of all embodiments according to the present disclosure. It can be understood that other embodiments may be used and structural or logical modifications may be made without departing from the scope of the present disclosure. Therefore, the following detailed description is not intended to be limiting, and the scope of the present disclosure is defined by the appended claims.

The vegetable transplanting device disclosed according to the present disclosure is further described below in connection with the accompanying drawings.

Figure 2:
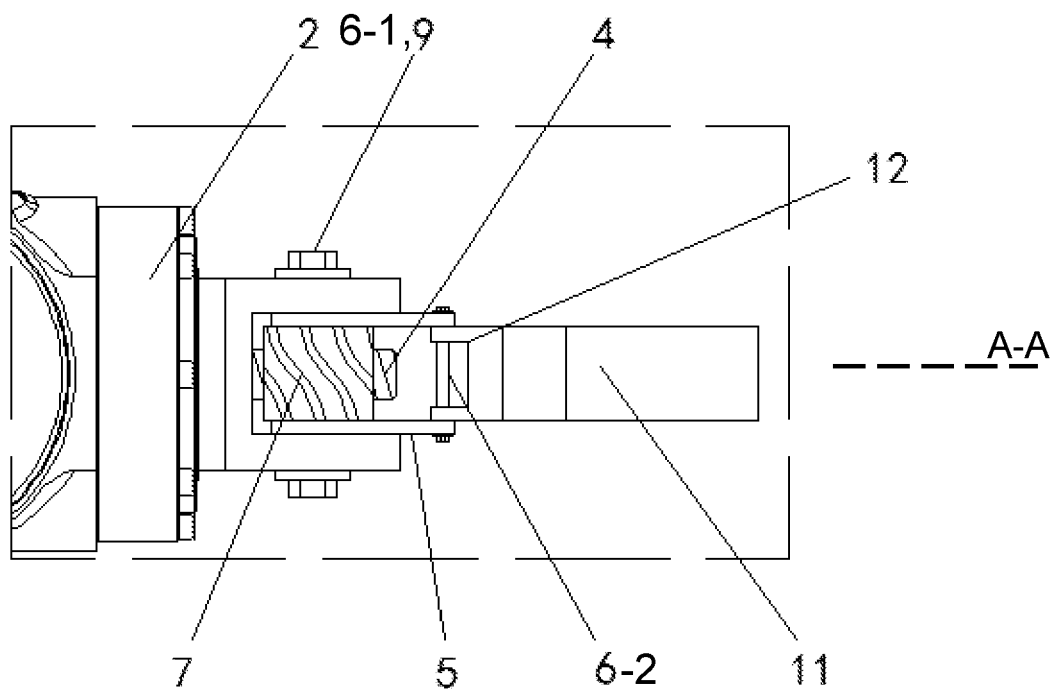
FIG. 2 is a schematic diagram of an enlarged view of part A in FIG. 1 according to an embodiment of the disclosure shown in FIG. 1.
Figure 3:
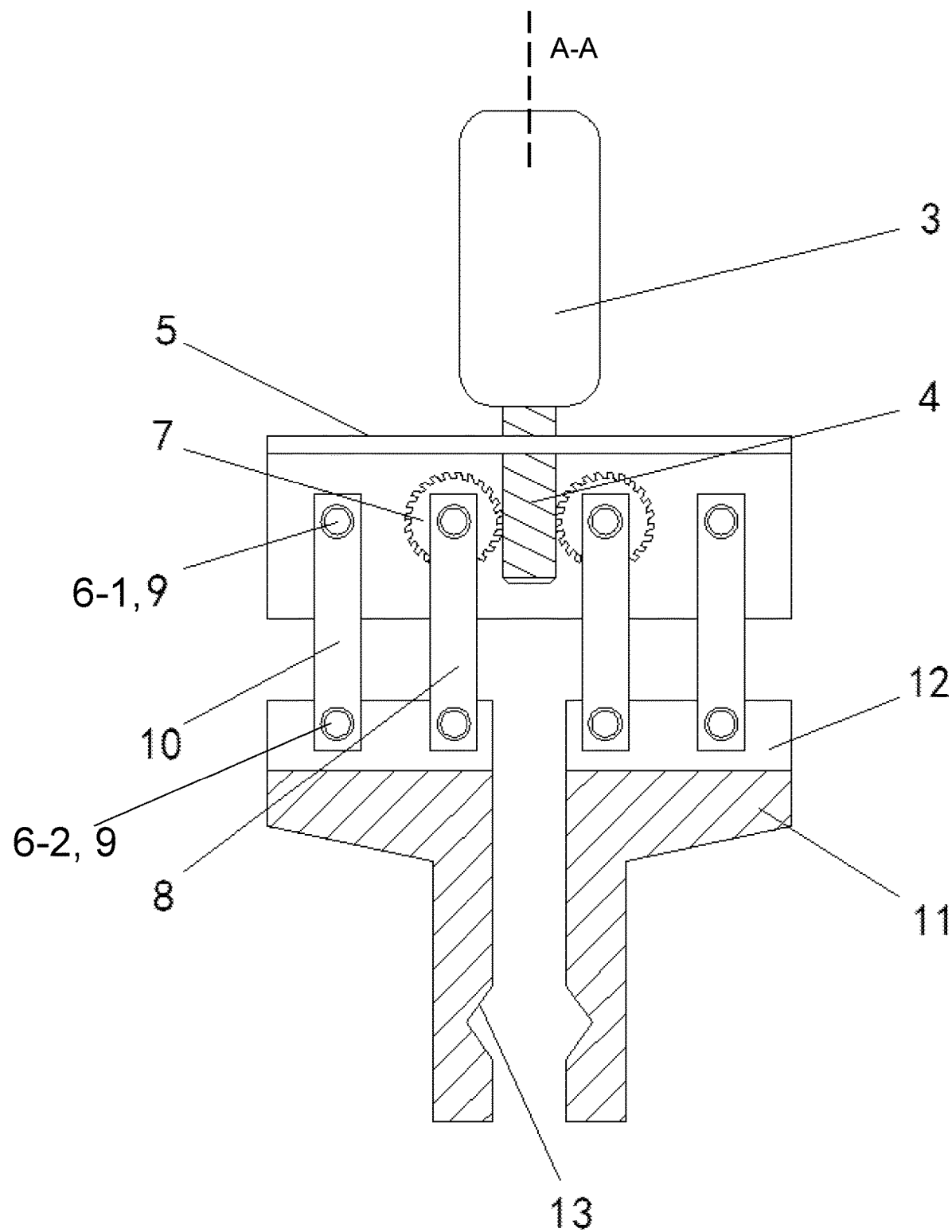
FIG. 3 is a schematic diagram of a top view of the vegetable transplanting device according to an embodiment of the disclosure.

Referring to FIGS. 1-3, one embodiment of the present disclosure provides a vegetable transplanting device. The device includes a robotic arm 1, a positioning ring 2 fixedly disposed on an outside of the robotic arm, and a transplant assembly arranged on an inside of the robotic arm. As shown in FIG. 2 and FIG. 3, A-A direction shows an axial direction of the positioning ring 2.

In some embodiments, the transplant assembly includes a motor 3 fixedly disposed at an end of the robotic arm 1, a fixing frame 5 fixedly mounted on a side surface of the positioning ring 2 away from the robotic arm 1, a worm screw 4 fixedly disposed at an output end of the motor 3, first fixing rods 6-1 fixedly disposed and passing through the fixing frame 5. For example, the positioning ring 2 has two opposite side surfaces (e.g., perpendicular to the A-A direction shown in FIG. 2), including one side surface contacting the robotic arm and the other side surface contacting the fixing frame 5. The motor 3 provides a power source for the robotic arm 1 to grip vegetables. The fixing frame 5 may be rotatably connected to the positioning ring 2. For example, an axial direction of the fixing frame 5 may also be A-A direction. In some embodiments, a longitudinal section of the fixing frame 5 (e.g., section along its axial direction) is a U shape with a ninety-degree rotation. The first fixing rods 6-1 pass through the fixing frame 5 along a direction perpendicular to the A-A direction (e.g., for connecting the two stems of the shape U). In some embodiments, both ends of the first fixing rod 6-1 are screwed with bolts 9 located on the upper and lower surfaces of the fixing frame 5.

In some embodiments, the transplant assembly may include four first fixing rods 6-1 distributed in the fixing frame 5 and in parallel with a side wall of the fixing frame 5.

The transplant assembly further includes at least one worm gear 7, each rotatably installed on an outside of a corresponding first fixing rod 6-1. For example, the worm gear 7 can be sleeved on the first fixing rod 6-1. The first fixing rod 6-1 installed with the worm gear 7 may be the rod located closer to the worm screw 4. The worm gear 7 is engaged with the worm screw 4 by teeth. FIG. 3 shows two worm gears 7 on both sides of the worm screw 4, one on each side. The rotation of the worm screw 4 can drive the worm gears 7 to rotate.

The transplant assembly further includes connecting rod assemblies each rotatably installed on the outside of at least one of the first fixing rods 6-1, and clamping members 11 each rotatably connected to one end of the corresponding connecting rod assembly away from the fixing frame 5. The clamping members 11 are symmetrically arranged with the worm screw 4 as the symmetrical axis, and can be driven to move towards each other to complete the clamping of a vegetables, and complete the transplantation under the control of an artificial intelligence program. As shown in FIG. 3, the transplant assembly includes two connecting rod assemblies, each installed with two first fixing rods 6-1 and two second fixing rods 6-2.

In some embodiments, the clamping member 11 is L-shaped, and includes one or more notches 12 on a side surface of the clamping member 11 facing the fixing frame 5. The notch 12 is configured to provide fixed installation support for a second fixing rod 6-2. FIG. 3 shows two notches on each clamping member 11. Both ends of the second fixing rod 6-2 are screwed with bolts 9 located on the upper and lower surfaces of the clamping member 11. The bolts 9 can ensure the stability of the movement of the connecting rod assembly, thereby reducing the damage to vegetables caused by clamping.

In some embodiments, each connecting rod assembly includes a first connecting rod 8 and a second connecting rod 10. The first connecting rod 8 is rotatably connected to the outside of the first fixing rod 6-1 and the second fixing rod 6-2 located near the worm screw 4, and the first connecting rod 8 is fixedly connected to the corresponding worm gear 7. The first connecting rod 8 can be deflected by the rotation of the worm gear 7. The second connecting rod 10 is parallel to the first connecting rod 8 and is rotatably connected to the outside of the other two fixing rods away from the worm screw 4 (i.e., the first fixing rod 6-1 and the second fixing rod 6-2). The first connecting rod 8 and the second connecting rod 10, the clamping member 11 and the fixing frame 5 together form a parallelogram structure, so that when the angle of one side edge of the structure is changed (i.e., due to the movement of the worm screw 4), the two adjacent sides can be closed and approached.

It In some embodiments, the two clamping members 11 are provided with clamping grooves 13 on their opposite sides. The outside of the vegetables to be transplanted is protected by a seedling ring. The clamping grooves 13 are compatible with and accommodate the seedling ring. For example, a shape formed by the clamping grooves 13 when the clamping members 12 are close by or meet matches with an outer shape of the seedling ring. The clamping grooves 13 facilitate the clamping members to achieve the clamping operation.

In operation, the robot arm 1 is moved to a position beside a vegetable, and the motor 3 drives the worm screw 4 on the output end to rotate, and the worm screw 4 drives the worm gear 7 to rotate around the first fixing rod 6-1 through tooth meshing. With the rotation, the worm gear 7 drives the first connecting rod 8 to deflect, and the other end of the first connecting rod 8 drives the clamping member 11 to do a retracting and clamping motion with the assistance of the second connecting rod 10, so that the two clamping members 11 can contact and complete a clamp action on the vegetable, thereby facilitating the precise transplanting process based on the artificial intelligence program.

The disclosed vegetable transplanting device has the advantages of being easy to use to clamp and transplant vegetables, and high transplant survival rate. The problem of low survival rate of vegetable transplantation under a clamping structure in related art can be solved by the vegetable transplanting device according to embodiments of the present disclosure. Specifically, the disclosed vegetable transplanting device includes connecting rod assemblies and clamping members that are arranged to form a parallelogram structure, which realizes precise clamping of vegetables. The parallelogram structure can be adjusted through the cooperating worm gear and worm screw driven by a motor, which ensures proper clamping control of the clamping member, thereby reducing damages to the vegetable caused by clamping, and ensuring a good survival rate after the vegetables are transplanted.

It should be noted that, in the present disclosure, relational terms such as first and second are used only to distinguish one entity or operation from another entity or operation, and do not necessarily require or imply any relationship or sequence exits between these entities or operations. Moreover, the terms "comprising", "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

Although various exemplary embodiments of the present disclosure have been described, various changes and modifications may be performed on the device apparent to those skilled in the art. One or some of the advantages of the present disclosure may be realized without departing from the spirit and scope of the content of the present disclosure. For those skilled in the art, other components performing the same function may be replaced appropriately. The features explained herein with reference to a particular figure may be combined with features of other figures, even in those cases where this is not explicitly mentioned. Furthermore, the methods of the present disclosure may be implemented either in all software implementations using appropriate processor instructions or in hybrid implementations that utilize a combination of hardware logic and software logic to achieve the same results. Such modifications to the solution according to the present disclosure are intended to be covered by the appended claims.

What is claimed is:

1. A vegetable transplanting device comprising:
a robotic arm;
a positioning ring fixedly disposed on an outside of the robotic arm; and
a transplant assembly connected to the robotic arm, comprising:
a motor fixedly disposed at an end of the robotic arm;
a fixing frame fixedly mounted on a side surface of the positioning ring away from the robotic arm;
a worm screw fixedly disposed at an output end of the motor;
first fixing rods fixedly disposed and passing through the fixing frame;
one or more worm gears, each rotatably installed on an outside of one of the first fixing rods, the worm gear being engaged with the worm screw by teeth;
connecting rod assemblies, each rotatably installed on the outside of at least one of the first fixing rods; and
clamping members, each rotatably connected to one end of the corresponding connecting rod assembly away from the fixing frame.

2. The device according to claim 1, wherein a longitudinal section of the fixing frame is a U shape with a ninety-degree rotation, and the fixing frame is rotatably connected to the positioning ring.

3. The device according to claim 1, wherein:
a quantity of the first fixing rods is four;
the first fixing rods are distributed in the fixing frame and in parallel with a side wall of the fixing frame; and
each of the one or more worm gears is rotatably connected to a corresponding one of the first fixing rods close to the worm screw.

4. The device according to claim 1, wherein each connecting rod assembly comprises:
a first connecting rod rotatably connected to two of the first fixing rods close to the worm screw, and fixedly connected to the corresponding worm gear; and
a second connecting rod in parallel with the first connecting rod, and rotatable connected to other two of the first fixing rods away from the worm screw.

5. The device according to claim 4, wherein:
the clamping member has an L shape;
a side surface of the clamping member facing the fixing frame is provided with a notch; and
ends of the first connecting rod and the second connecting rod are rotatably connected to the clamping member at the notch.

6. The device according to claim 1, wherein:
the device comprises two of the clamping members; and
each of the two clamping members are configured with a clamping groove on a side surface facing the other clamping member, the clamping grooves are configured to be compatible with a seedling ring, the seedling ring being used to protect a vegetable to be transplanted.

7. The device according to claim 1, wherein:
two ends of each of the first fixing rods are installed to the fixing frame with bolts.

8. The device according to claim 1, further comprising:
second fixing rods, two ends of each of the second fixing rods are installed to the corresponding clamping member with bolts.

9. A transplant assembly used in a vegetable transplanting device, comprising:
a motor fixedly disposed at an end of a movable arm of the vegetable transplanting device;
a fixing frame fixedly mounted on a side surface of a positioning ring away from the movable arm;
a worm screw fixedly disposed at an output end of the motor;
first fixing rods fixedly disposed and passing through the fixing frame;
one or more worm gears, each rotatably installed on an outside of one of the first fixing rods, the worm gear being engaged with the worm screw by teeth;
connecting rod assemblies, each rotatably installed on the outside of at least one of the first fixing rods; and
clamping members, each rotatably connected to one end of the corresponding connecting rod assembly away from the fixing frame.

10. The transplant assembly according to claim 9, wherein a longitudinal section of the fixing frame is a U shape with a ninety-degree rotation, and the fixing frame is rotatably connected to the positioning ring.

11. The transplant assembly according to claim 9, wherein:
a quantity of the first fixing rods is four;
the first fixing rods are distributed in the fixing frame and in parallel with a side wall of the fixing frame; and
each of the one or more worm gears is rotatably connected to a corresponding one of the first fixing rods close to the worm screw.

12. The transplant assembly according to claim 9, wherein each connecting rod assembly comprises:
a first connecting rod rotatably connected to two of the first fixing rods close to the worm screw, and fixedly connected to the corresponding worm gear; and
a second connecting rod in parallel with the first connecting rod, and rotatable connected to other two of the first fixing rods away from the worm screw.

13. The transplant assembly according to claim 12, wherein:
the clamping member has an L shape;
a side surface of the clamping member facing the fixing frame is provided with a notch; and
ends of the first connecting rod and the second connecting rod are rotatably connected to the clamping member at the notch.

14. The transplant assembly according to claim 9, wherein:
the device comprises two of the clamping members; and
each of the two clamping members are configured with a clamping groove on a side surface facing the other clamping member, the clamping grooves are configured to be compatible with a seedling ring, the seedling ring being used to protect a vegetable to be transplanted.

15. The transplant assembly according to claim 9, wherein:
two ends of each of the first fixing rods are installed to the fixing frame with bolts.

16. The transplant assembly according to claim 9, further comprising:
second fixing rods, two ends of each of the second fixing rods are installed to the corresponding clamping member with bolts.

* * * * *